United States Patent
Billault et al.

[11] 3,877,184
[45] Apr. 15, 1975

[54] METHOD FOR WORKING FLEXIBLE CONTACT LENSES

[75] Inventors: Pierre Billault, Bry-Sur-Marne; Gerard Gomond, Paris, both of France

[73] Assignee: Essilor International (Compagnie Generale d'Optique), Joinville-le-Pont, France

[22] Filed: May 10, 1973

[21] Appl. No.: 358,908

[30] Foreign Application Priority Data
May 18, 1972 France.............................. 72.17783

[52] U.S. Cl...................................... 51/284; 51/324
[51] Int. Cl............................ B24b 1/00; B24b 9/14
[58] Field of Search.... 51/284, 324, 216 LP, 103 C, 51/105 LG, 131, 162

[56] References Cited
UNITED STATES PATENTS

| | | | |
|---|---|---|---|
| 3,353,303 | 11/1967 | Stern................................ | 51/284 X |
| 3,514,908 | 6/1970 | Herbert............................. | 51/284 |
| 3,528,326 | 9/1970 | Kilmer.......................... | 51/284 UX |
| 3,693,301 | 9/1972 | Lemaitre........................... | 51/284 X |
| 3,722,143 | 3/1973 | Cottom............................. | 51/284 X |
| 3,750,272 | 8/1973 | Gomond........................... | 51/284 X |

*Primary Examiner*—Donald G. Kelly
*Attorney, Agent, or Firm*—Young & Thompson

[57] ABSTRACT

A method for machining the peripheral portion of flexible contact lenses. A flexible contact lens blank is gripped between a pair of aligned rotary spindles which are then set in rotation. The actual machining is effected by a working surface which is preferably planar and covered with an abrasive material corresponding to the type of working treatment the contact lens blank is to undergo. The working surface is brought into contact with the angular peripheral edge of the lens blank until there is deformation of the peripheral portion of the lens blank. By holding the working surface in position relative to the lens blank being worked, the faces of the blank at the periphery are automatically alternately and successively worked.

3 Claims, 6 Drawing Figures

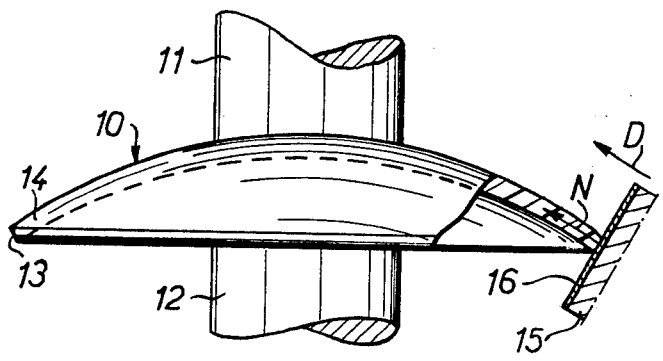
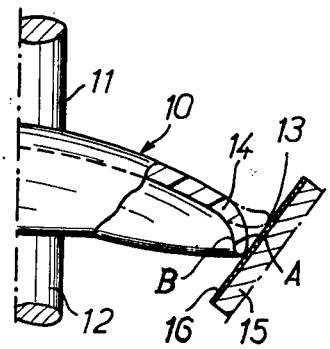
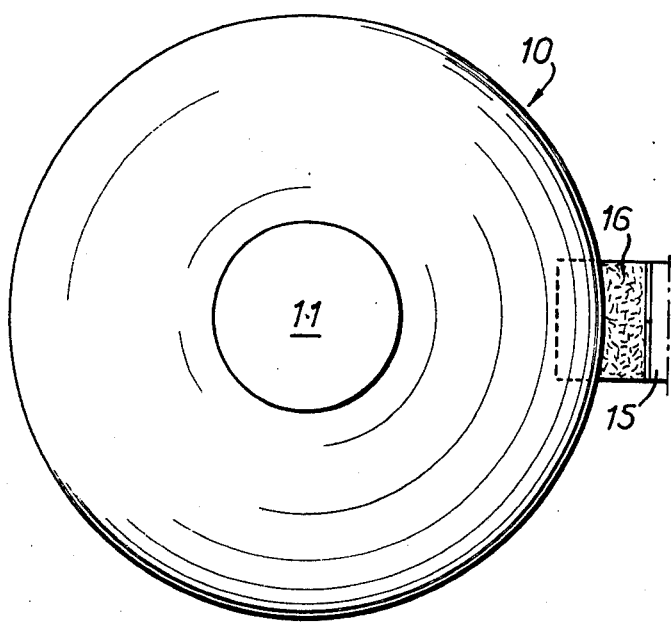
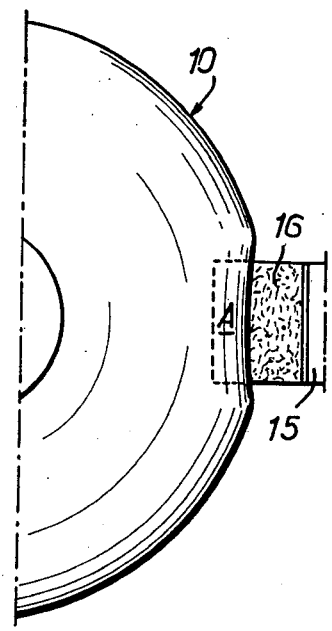
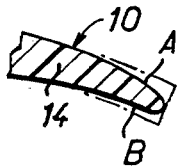
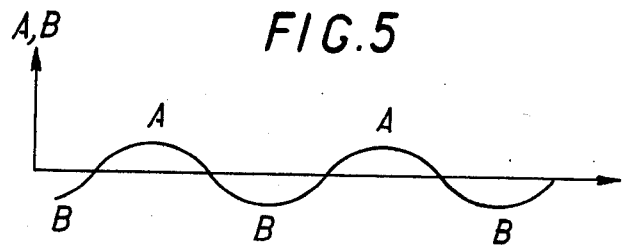

METHOD FOR WORKING FLEXIBLE CONTACT LENSES

The present invention concerns any one of the working operations such as machining, softening, polishing or grinding, carried out at periphery of a flexible contact lens.

Flexible contact lenses are usually made by molding. Flexible lenses are most often moulded to a diameter greater than the final lens diameter and then a peripheral portion is removed for reducing the diameter to the desired dimension, and finally a machining of the peripheral edge of the lens which is necessary to obtain a suitable profile.

The machining operation is particularly important since the possibility of prolonged use by its wearer depends at least in part on the results thereof.

Now, since we are concerned with flexible contact lenses, namely contact lenses of silicone, such machining is relatively difficult to carry out; indeed, the flexible nature of the lens in itself creates an obstacle to machining.

Various systems have been proposed to overcome this difficulty. Essentially they attempt to effect temporary rigidity by spinning or freezing to enable machining.

These systems have not shown themselves adapted to low cost mass production of contact lenses. Accordingly, flexible contact lenses have not as yet been made commercially available.

The aim of the present invention is a method which takes advantage of the very flexibility of flexible contact lenses and thereby facilitates the machining of the peripheral edge of the lens.

The invention consists in a method of working the peripheral portion of a flexible contact lens, comprising gripping a flexible contact lens blank between a pair of rotary spindles, rotating the spindles, bringing a working surface into contact with the lens blank until there is deformation of the peripheral portion of the lens blank, the opposed faces of the peripheral portion of the lens blank thereby being alternately worked.

The invention further consists in an apparatus for working the peripheral portion of a flexible contact lens blank, comprising a pair of coaxial rotary spindles axially movable relative to each other for gripping and rotating a flexible contact lens blank therebetween, a working surface mounted for lateral movement relative to the rotary spindles obliquely with respect to the axis of the spindles.

It has been found that the resilient deformation of the contact lens being worked which is at the very heart of the present invention periodically reverses itself so that the two faces of the peripheral portion of the contact lens are alternately and successively in contact with the working surface.

In the course of a first pass the working surface is of a first suitable abrasive material enabling the rough grinding of the peripheral portion of the lens.

In the course of subsequent passes, the working surface is of finer and finer grained material enabling user to arrive at a very satisfactory satin ground finish.

Experience shows that the lenses worked in this way have a satisfactory wearer tolerance level.

Further advantages and features of the present invention will be brought out in the description which follows by way of example with reference to the accompanying schematic drawings in which:

FIG. 1 is a partly cut-away elevation view of the present device during a first step of the present method;

FIG. 2 shows a plan view of the device of FIG. 1;

FIG. 3 and 4 are partial views similar to FIGS. 1 and 2 respectively illustrate a second step of the method according to the invention;

FIG. 5 shows a diagram illustrating the operation of the device; and

FIG. 6 is an enlarged partial view of the periphery of the lens.

In FIG. 1 a flexible contact lens blank 10 is shown gripped between two rotary spindles 11, 12 in a manner known per se. At least one of the spindles 11 and 12 is driven in rotation by suitable drive means (not shown). The contact lens blank is geometrically centered along the axis of rotation of the rotary spindles 11, 12.

The blank is obtained by molding to a diameter greater than the final lens diameter then removing a peripheral portion; the edge 13 of the periphery 14 is therefore rather pointed or angular.

What is involved is the grinding down of the periphery 14 by removing material from both faces of the periphery portion forming a finger-shaped tapered configuration.

Accordingly, the apparatus comprises a support 15 carrying a planar working surface 16, the support 15 being movable relative to the rotary spindles 11 in a direction D oblique with respect to the axis of the rotary spindles.

The working surface is oriented in such a way as to come into contact with the peripheral edge 13 of the lens blank perpendicular to the periphery. In other words, the normal N of the working surface 16 in contact with the peripheral edge 13 of the lens is situated along the median plane of the periphery.

The working surface 16 may be formed of any working material.

For the first work pass which is more precisely a machining or reducing pass, the material is, for example, an abrasive of the type used for working flexible synthetic materials. By way of example, the material sold by NORTON under the mark DURITE E 800 is satisfactory.

By displacement of the support 15 which carries the working surface 16, the latter is brought into contact with the peripheral edge 13 of the lens blank to be machined perpendicular to the edge (FIG. 1) after the rotary spindles 11, 12 are moved into gripping position with the lens blank therebetween.

The advance of the support 15 perpendicular to the periphery 14 of the lens blank is continued until the force exerted thereon causes a deformation, more particularly a resilient deformation, of the periphery (FIG. 3).

This deformation may reach for example 0.2 to 0.3 mm for a lens blank having a diameter of approximately 9 mm. Experience shows that during the rotation of the spindles 11, 12, the resilient deformation reverses itself alternately and successively to both sides of the normal or rest position of the lens blank. In other words this deformation is alternately below the normal or rest position of the lens blank such as shown in solid lines in FIG. 3 and above this normal or rest position such as illustrated in broken lines in FIG. 3.

When the lens is deformed to move below the rest or normal position of the lens, the top face A of the lens blank is in contact with the working surface 16 thereby machining this face. Alternatively, when the lens blank is deformed to move above the normal or rest position of the lens blank, the bottom face B of the lens blank is in contact with the working surface 16 machining this face in turn.

This alternate machining of the faces A and B of the lens is symbolized in the graphic showing in FIG. 5 wherein time is represented along the X-axis and the side machined along the Y-axis.

FIG. 6 illustrates the results obtained translated into the desired forming of the periphery 14 of the lens blank by removing material from the upper face A of the periphery during certain periods and from the lower face B during other periods. In FIG. 6 the final configuration of the periphery is shown in solid lines, and the original peripheral configuration is shown in broken lines.

Other passes may follow the above-described machining pass, for example, the grinding or polishing of the periphery of the lens.

Such a polishing step is effected by using a suitable working surface 16 comprising for example pitch with which a suitable amount of pulverulent abrasive material is combined.

The present invention is, of course, not limited to the above-described embodiment but includes all possible variations, alternatives, modifications within the scope of the appending claims.

What we claim is:

1. A method of working the peripheral portion of a flexible contact lens, comprising gripping a flexible contact lens blank between a pair of rotary spindles, rotating the spindles, bringing a working surface into contact with the lens blank until there is deformation of the peripheral portion of the lens blank, the opposed faces of the peripheral portion of the lens blank thereby being alternately worked.

2. A method according to claim 1, wherein the working surface is applied perpendicular to the peripheral edge of the contact lens blank.

3. A method according to claim 1, wherein there is an abrasive material on the working surface and the steps are repeated with another working surface comprising an abrasive material finer than that of the first working surface.

* * * * *